April 10, 1956 R. ADLER 2,741,721

ELECTRON-DISCHARGE DEVICE

Filed Dec. 28, 1951 3 Sheets-Sheet 1

INVENTOR:
ROBERT ADLER
BY Francis W. Crotty
HIS ATTORNEY.

April 10, 1956 R. ADLER 2,741,721
ELECTRON-DISCHARGE DEVICE
Filed Dec. 28, 1951 3 Sheets-Sheet 2

INVENTOR:
ROBERT ADLER
BY Francis W. Crotty
HIS ATTORNEY.

INVENTOR.
ROBERT ADLER
BY Francis W. Crotty
HIS ATTORNEY.

Patented Apr. 10, 1956

2,741,721

ELECTRON-DISCHARGE DEVICE

Robert Adler, Northfield, Ill., assignor to Zenith Radio Corporation, a corporation of Illinois Application December 28, 1951, Serial No. 263,737

32 Claims. (Cl. 315—21)

This invention relates to electron-discharge devices and more particularly to special purpose electron tubes particularly adapted for use in synchronizing and automatic gain control systems of television receivers and the like.

In the copending applications of Robert Adler, Serial No. 139,401, filed January 19, 1950, now U. S. Patent No. 2,606,300, issued August 5, 1952, for "Electron-Discharge Devices" and Serial No. 139,402, filed January 19, 1950, for "Synchronizing-Control Apparatus," now abandoned in favor of Serial No. 267,826, filed January 23, 1952, for "Frequency-Controllable Oscillating System," now Patent No. 2,684,404, issued July 20, 1954 both assigned to the present assignee, there are disclosed and claimed a novel electron-discharge device and system for use as a synchronizing-control arrangement in a television receiver or the like. In the preferred embodiment, a two-section tube is employed, the first section operating as a synchronizing-signal clipper and balanced line-frequency phase-detector to develop between a pair of anodes a balanced unidirectional control voltage indicative of the phase difference between the local line-frequency oscillator and the incoming line-frequency synchronizing-signal pulses. In the other section of the tube, a beam is simultaneously subjected to a sinusoidal magnetic-deflection field energized from the line-frequency sweep output and to a slow lateral displacement in accordance with the balanced unidirectional control voltage developed between the two phase-detector anodes in the other section. In this manner, the duty cycles of two final anodes in the second section of the tube are caused to vary in accordance with the unidirectional control potential developed between the phase-detector anodes of the first section. Either the leading edge or the trailing edge of the developed quasi-square wave is employed to drive the line-frequency sweep system. The output voltages appearing at the phase-detector anodes may be combined and integrated to provide field-frequency output pulses for controlling the field-frequency sweep system, or a separate anode may be provided for this purpose. Thus, a single tube, together with a small number of external circuit elements, performs the several functions of synchronizing-signal separator, automatic-frequency-control (AFC) phase-detector, line-frequency oscillator, and reactance tube, providing a substantial saving in comparison with conventional systems which usually employ three or more tubes to perform these functions. However, a synchronizing-control tube of this type is of relatively complex construction and requires the use of an external magnetic field energized from the output of the line-frequency sweep system.

In the copending application of Robert Adler, Serial No. 242,509, filed August 18, 1951, for "Television Receiver," and assigned to the present assignee, there are disclosed and claimed a novel tube and system for obtaining both noise-immune synchronizing-signal separation and automatic gain control generation. In a preferred form of this system, a sheet-like electron beam of substantially rectangular cross-section is projected through a deflection-control system toward a target electrode which is provided with a pair of apertures and is followed by plate electrodes for collecting space electrons which pass through the respective apertures. Detected composite video signals are applied to the deflection-control system in such a manner that space electrons are permitted to pass through the two apertures in the target electrode only during synchronizing-pulse intervals. Moreover, extraneous noise impulses, which are generally of much greater amplitude than the desired synchronizing pulses, cause transverse deflection of the beam beyond the apertures so that space electron flow to the plate electrodes is again interrupted. One of the plate electrodes is employed to derive noise-immune output pulses corresponding to the synchronizing-pulse components of the applied composite video signals, and these output pulses drive the line-frequency and field-frequency scanning systems. A keying signal, derived from the line-frequency and/or field-frequency scanning system, is applied to the other plate electrode to obtain a gated automatic gain control potential which is then applied in a conventional manner to one or more of the early receiving stages. In order to insure the establishment of synchronizing-pulse output at the first plate electrode by the time the automatic gain control system goes into effect to limit further growth of the signal, the two apertures in the target electrode are disposed in overlapping alignment in a direction parallel to the plane of the sheet-like electron beam. In addition to providing noise-immune synchronizing-signal separation and automatic gain control generation in a single tube, this system has the important advantage of automatically establishing the correct synchronizing-signal clipping level for all receiver-input signal levels, with the result that incorrect synchronizing-pulse clipping which might otherwise be caused by drift or misadjustment of the automatic gain control circuits is effectively precluded.

In the copending application of John G. Spracklen, Serial No. 246,768, filed September 15, 1951, for "Television Receiver," and assigned to the present assignee, there are disclosed and claimed a still further novel tube and system for combining the desirable features embodied in the systems of the aforementioned Adler applications. To achieve this objective, the requirement for a magnetic deflection field is obviated by modifying the tube construction and external circuit connections to provide phase detection by means of a gating action. To this end, the single synchronizing-signal output plate of the last mentioned Adler tube is replaced by at least a pair of phase-detector plate electrodes symmetrically positioned behind the sync clipping aperture. A balanced comparison signal is applied between the two phase-detector plates from the line-frequency scanning system of the receiver. When the desired condition of phase synchronism exists, the phase-detector plates are maintained at equal potentials; however, upon deviation from synchronism, a balanced control potential indicative of the magnitude and direction of the deviation is developed. In accordance with a preferred embodiment, this system is employed in conjunction with a deflection tube oscillator, and the phase-detector plate electrodes are direct-coupled to the deflection plates of the oscillator tube to effect automatic frequency control.

While the tube and system described and claimed in the aforementioned Spracklen application are operative and afford numerous advantages as compared with conventional synchronizing and automatic gain control systems, it has been found that certain difficulties of a practical nature may be encountered under abnormal operating conditions. In particular, with a tube in which the phase-detector electrodes are constructed as simple conluctive plates following the sync clipping aperture, no nore than fifty percent of the space current passing hrough the aperture can be effective to contribute to the phase-detector output since, with the phase-detector elec-rodes operated in counterphase, current rejected by one plate cannot be utilized by the other. Moreover, a large part of the rejected space current may be returned to the space between the input deflectors, and some of the returned electrons may strike the active deflector to which the input composite video signals are applied. Such an operating condition is undesirable for the reason that the collection of returned electrons by the active deflector has a degenerative effect which may result in a substantial compression of the synchronizing-signal components at the input deflector, thus rendering the separation of synchronizing information from the video-signal components more difficult. It has been found that the degenerative effect of returned electrons on the input signal at the active deflector is most accentuated for such structural arrangements as result in high current to the phase-detector plate electrodes at low operating voltages, a condition which is desirable in order to effect optimum automatic-frequency-control action.

Consequently, it is a primary object of the present invention to provide a new and improved electron-discharge device of the same general type as that described and claimed in the above-identified Spracklen application which is so constructed as to insure that substantially all space current passing through the sync clipping aperture is utilized in the production of the unidirectional AFC potential, whereby optimum automatic-frequency-control action is achieved.

It is another object of the invention to provide a new and improved balanced output electrode construction for an electron-discharge device.

Still a further object of the present invention is to provide an improved balanced output electrode arrangement for a tube of the type described and claimed in the above-identified Spracklen application.

In accordance with one feature of the present invention, a new and improved electron-discharge device comprises means including an electron-emissive cathode for projecting an electron stream generally along a predetermined axis. The device further comprises a pair of electrodes having control portions disposed on opposite sides of the axis and terminating in respective electron-impervious collector portions on corresponding opposite sides of the axis and electrically connected to the control portions, the collector portions conjointly defining a collector system which effectively intercepts the axis at a location more remote from the cathode than the control portions; for convenience, these electrodes are hereinafter referred to as "controllector" electrodes, since each comprises a control portion and a collector portion.

In accordance with another feature of the invention, certain of the above-mentioned objects are accomplished by providing an electron-discharge device comprising in the order named an electron gun for projecting an electron beam, a deflection-control system (which may be electromagnetic but is preferably electrostatic) responsive to an applied input signal for subjecting the beam to a transverse deflection field, a target electrode having an aperture which is narrow with respect to the full deflection range of the deflection-control system and which is centered on a predetermined axis, a pair of deflection-control electrodes disposed on opposite sides of that axis, and a collector system. Moreover, means including the target electrode and the deflection-control electrodes are provided for focusing the beam to converge on the collector system at a location substantially independent of the input signal applied to the deflection-control system.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is used to denote the varying unidirectional signal after detection.

Figures 1, 4A, 4B, 4C, 5:
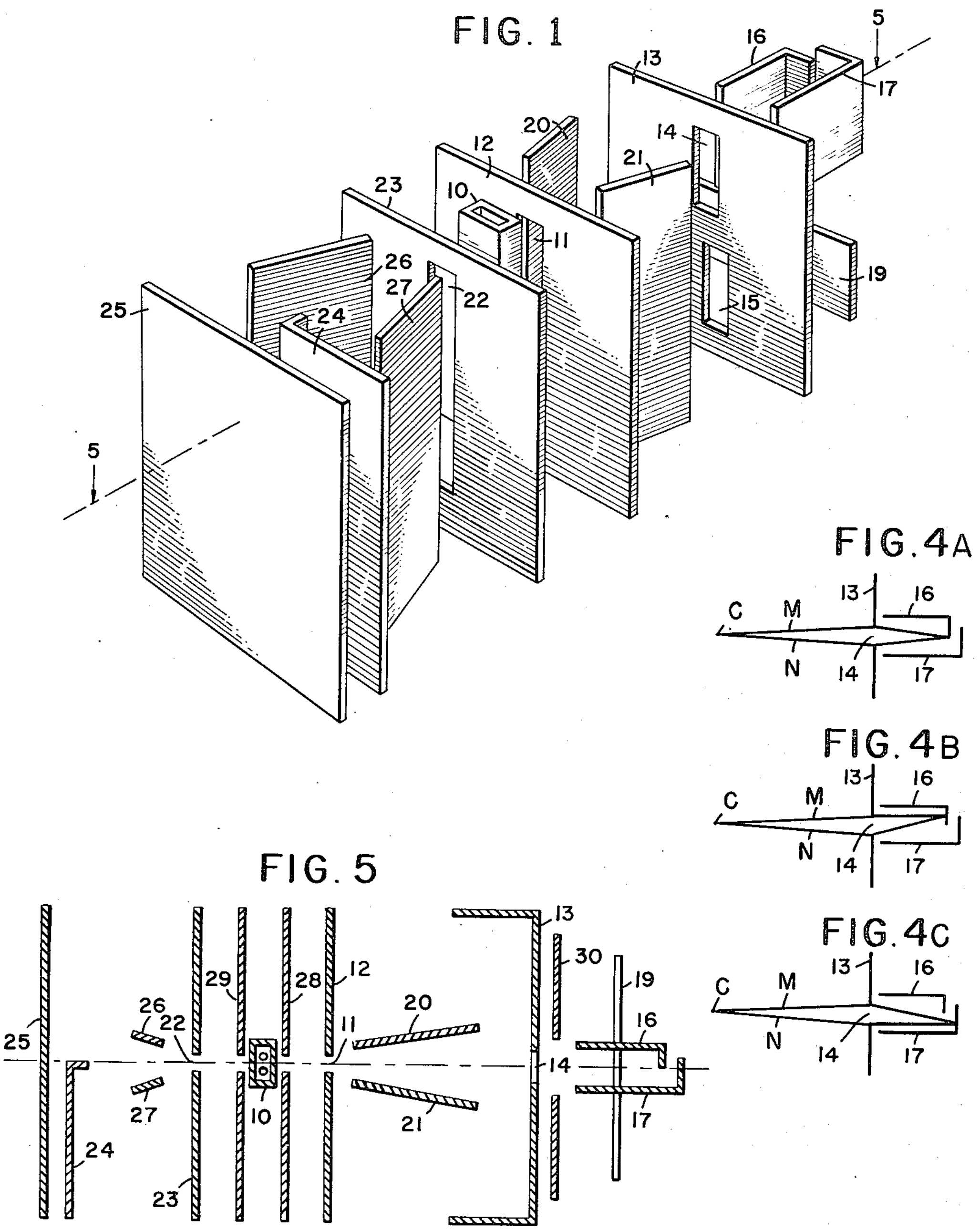
Figure 1 is a perspective view of the essential elements of an electron-discharge device constructed in accordance with the present invention.
Figures 4A, 4B and 4C are schematic representations illustrating a feature of the operation of the invention.
Figure 5 is a cross-sectional view, taken along a line similar to the line 5—5 in Figure 1, of a modified electrode arrangement embodying the invention.

In the perspective view of Figure 1, which illustrates the essential elements of an electron-discharge device constructed in accordance with the invention, two separate sheet-like electron beams of substantially rectangular cross-section are projected from opposite electron-emissive surfaces of a common elongated cathode 10 having an indirect heater element (not shown). In the right-hand half of the tube, as viewed in Figure 1, space electrons originating at cathode 10 are projected through a slot 11 in an accelerating electrode 12 toward a target electrode or intercepting anode 13 which is provided with a pair of rectangular apertures or slots 14 and 15 in overlapping alignment in a direction parallel to cathode 10. A pair of specially constructed electrodes 16 and 17 are provided for collectively receiving space electrons which pass through aperture 14, and an additional plate electrode 19 is provided for receiving space electrons which pass through aperture 15. A deflection-control system, illustrated as a pair of electrostatic-deflection plates 20 and 21, is provided between accelerating electrode 12 and intercepting anode 13. Preferably the tube is so constructed and operated that the width of the beam at the plane of target electrode 13 is less than that of aperture 14.

In the left-hand half of the tube, as viewed in Figure 1, electrons originating at cathode 10 are projected through a slot 22 in an accelerating electrode 23 toward a pair of anodes 24 and 25 respectively having active portions on opposite sides of the undeflected path of this second beam. A pair of electrostatic-deflection plates 26 and 27 are provided between slot 22 and anodes 24 and 25.

Structurally, the device of Figure 1 is substantially identical with that described in the above-identified Spracklen application with the exception of the particular construction and arrangement of electrodes 16 and 17. In accordance with the present invention, these electrodes instead of being simple flat plates are constructed in such a manner as to form a deflection-control system followed by a collector system for receiving substantially all electrons projected through aperture 14 of target electrode 13. Each of the electrodes 16 and 17 comprises a longitudinally extending deflection-control portion disposed in a plane substantially parallel to the axis or central plane of the beam projected through aperture 14, and a collector portion on the same side of the axis as the control portion and electrically connected to the control portion, preferably by integral construction of the control portion and the collector portion. The collector portions of the two electrodes 16 and 17 conjointly define a collector system which effectively intercepts the axis at a location more remote from the cathode than the control portions. Specifically, in the preferred arrangement as shown in Figure 1, the collector portions constitute inwardly directed integral parts of the respective electrodes 16 and 17 extending toward the beam axis in spaced parallel planes substantially normal to the axis, and at least one of the collector portions intersects the axis to provide an overlapping arrangement for preventing any of the electrons projected through aperture 14 from penetrating beyond the collector system. For convenience, in the absence of any established terminology for describing electrodes of this type, electrodes 16 and 17 are hereinafter termed "controllector" electrodes, a term derived from a contracted combination of "control" and "collector." The controllector system may also be viewed as a pair of deflection-control electrodes and a pair of collector electrodes electrically connected to, and preferably integral with, the control electrodes.

In operation, the transverse deflection field established by deflection plates 20 and 21 is adjusted to direct the electron beam in the right-hand section of the tube to an electron-impervious portion of target electrode 13, for example, to a solid portion of electrode 13 on the side of aperture 14 nearer deflection plate 20. When an input signal of positive polarity is applied to deflection plate 21, or alternatively when an input signal of negative polarity is applied to deflection plate 20, the beam is deflected at least partially into apertures 14 and 15 whenever the input signal reaches a predetermined amplitude level. During such intervals, current is permitted to flow in the output circuits associated with controllector electrodes 16, 17 and plate electrode 19, provided these electrodes are maintained at a proper potential to receive electrons, while during other intervals no such current flow can occur. Moreover, when the input signal exceeds a predetermined higher amplitude, the beam is deflected beyond aperture 14 of intercepting anode 13, and current flow to controllector electrodes 16 and 17 is again interrupted. At still greater amplitudes, the current flowing to plate electrode 19 is extinguished as the beam sweeps beyond aperture 15. Thus it is apparent that, in a broad sense, deflection-control system 20, 21 and apertured target electrode 13 constitute means for effectively controlling the intensity of the electron beam projected between controllector electrodes 16 and 17.

Figure 2:
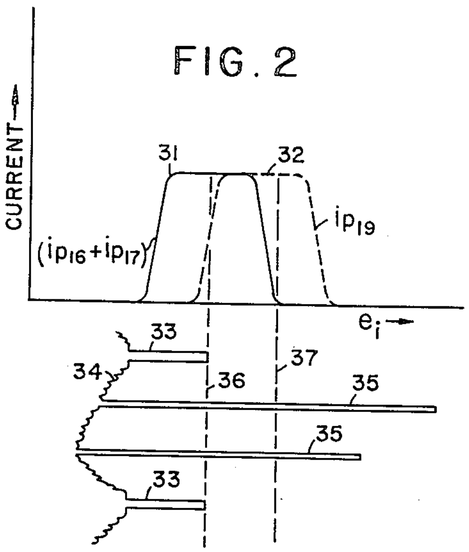
Figures 2 and 3 are graphical representations of certain operating characteristics useful in understanding the operation of the invention.

The transfer characteristics of the input deflection-control system with respect to the controllector electrode system and with respect to the plate electrode 19 are represented by curves 31 and 32 respectively of Figure 2. Curve 31 represents the total current ($i_{p16}+i_{p17}$) flowing to controllector electrodes 16 and 17 as a function of the input voltage $e_i$ applied to the deflection-control system comprising deflection plates 20 and 21. Curve 32 shows the current $i_{p19}$ to plate electrode 19 as a function of the input voltage $e_i$. If, as shown in Figure 1, apertures 14 and 15 are of identical length and width and are disposed in overlapping alignment in a direction parallel to elongated cathode 10, curves 31 and 32 are of corresponding magnitude and shape, as illustrated in Figure 2. However, the transfer characteristics represented by curves 31 and 32 may be altered if desired by suitably changing the geometry of apertures 14 and/or 15; for example, it may be desirable to provide an extension of slot 15 in a direction generally toward deflection plate 21 to avoid paralysis of the AGC system, as described in certain of the above-identified applications.

Controllector electrodes 16 and 17, which each comprise electrically connected control and collector portions, are disposed in effectively symmetrical relation with respect to an axis passing through the center of aperture 14 and, in operation, are preferably biased to equal positive unidirectional operating potentials. The collector portions conjointly define a collector system for collectively receiving substantially all electrons projected through aperture 14, and the control portions serve as a deflection-control system responsive to applied signals for controlling the space current distribution between the collector portions. The control characteristics of the controllector electrodes 16 and 17 are shown qualitatively in Figure 3, in which curve 38 represents the current $i_{p16}$ to electrode 16 and curve 39 the current $i_{p17}$ to electrode 17 as functions of the potential difference $e_{p16}-e_{p17}$ between the two controllector electrodes.

In accordance with an important feature of the invention, it has been found that the current distribution between controllector electrodes 16 and 17 may be made substantially independent of the position at which the beam enters slot 14 of target electrode 13. This desirable condition is obtained over a broad range of positive bias potentials for controllector electrodes 16 and 17, as for example between one-fifth and one-third of the voltage applied to target electrode 13. When so operated, target electrode 13 and controllector electrodes 16 and 17 form an electrostatic lens for focusing the beam, whenever it passes through slot 14, to converge on the collector system at a location substantially independent of the input signal applied between deflection-control electrodes 20 and 21.

This operating condition is schematically depicted in Figures 4A, 4B, and 4C, in each of which figures two different beam trajectories M and N, representing limiting operating conditions for beam current through slot 14, are shown. As indicated in Figure 4A, when the controllector electrodes 16 and 17 are instantaneously maintained at suitable equal positive potentials, space electrons effectively originating at the center of deflection C of deflection-control electrodes 20 and 21 and passing through slot 14 are focused to converge at the effective intersection of the collector portions of electrodes 16 and 17, and this condition exists for all beam trajectories between M and N, i. e., regardless of the point of entry of the space electrons into slot 14. If the potential of controllector electrode 16 instantaneously exceeds that of electrode 17 by more than a predetermined minimum amount 2 v. (Figure 3), all electrons passing through slot 14 are directed to electrode 16, as illustrated schematically in Figure 4B. On the other hand, if the potential of controllector electrode 17 instantaneously exceeds that of electrode 16 by an amount greater than 2 v., all electrons passing through slot 14 are collected by electrode 17, as shown in Figure 4C. Thus it is apparent that controllector electrodes 16 and 17 perform two distinct functions. Those portions of electrodes 16 and 17 nearest slot 14 constitute a deflection-control system, while those portions most remote from slot 14 conjointly define a collector system for receiving substantially all electrons projected through the slot. Moreover, by a suitable choice of operating potentials, the control characteristics of the controllector electrodes may be rendered substantially independent of the deflection-control system preceding slot 14.

Figure 3:
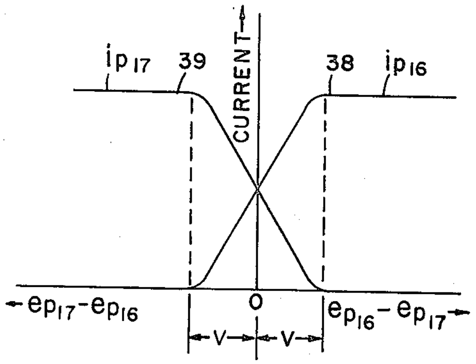

In practice, it has been found that the operating characteristics of Figure 3 remain substantially unchanged throughout a fairly wide range of positive bias potentials for controllector electrodes 16 and 17. Curves 38 and 39 intersect symmetrically, for an effectively symmetrical physical construction, and the current is divided equally between electrodes 16 and 17 when their potentials are equal. Secondary electrons originating at controllector electrodes 16 and 17 are effectively trapped in the enclosed region between these electrodes.

The left-hand portion of the structure of Figure 1 constitutes a conventional deflection-control electrode system. The electron beam projected through slot 22 of accelerating electrode 23 is directed either to anode 24 or to anode 25 in accordance with the instantaneous potential difference between electrostatic-deflection plates 26 and 27. If a sinusoidal signal is applied between deflection plates 26 and 27, the beam is caused cyclically to sweep back and forth between anode 24 and anode 25. Consequently, since full beam current is switched from one anode to the other in a relatively small fraction of a cycle, oppositely phased square-wave output signals are produced in load circuits respectively associated with output anodes 24 and 25; in the preferred embodiment of the invention, only one square-wave output signal is required, and either anode 24 or anode 25 is employed to develop the output signal while the other is directly connected to accelerating electrode 23.

The two electrode systems are combined in a single tube structure and are arranged to cooperate with each other in a particular manner to be hereinafter described in detail. Specifically, the combined tube structure of Figure 1 is particularly well adapted to serve as a combined noise-immune synchronizing-signal separator, balanced automatic-frequency-control phase-detector, line-frequency oscillator, reactance tube, and automatic gain control generator in a television receiver or the like.

In Figure 1, only the essential elements of the electrode system are illustrated. Refinements of this system may be made in accordance with well-known practices in the art. Thus, for example, as shown in Figure 5, plate electrodes 28 and 29 each having a slot narrower than the emissive surface of cathode 10 may be interposed between cathode 10 and either or both of the accelerating electrodes 12 and 23 and maintained at or near cathode potential to restrict electron emission to a narrow central portion of the respective emissive surfaces of cathode 10. Moreover, it may be advantageous to include one or more suppressor electrodes, such as electrode 30, between intercepting anode 13 and electrodes 16, 17 and 19. The particular form of deflection-control means employed in the structure of Figure 1 is not essential to the present invention; one or more of the deflection plates 20, 21, 26, and 27 may be replaced by several electrodes biased at different potentials which may correspond, for example, to cathode potential and the D. C. supply voltage of the associated apparatus with which the tube is employed. As shown in Figure 5, deflection plates 26 and 27 in the left-hand section of the tube may be considerably shortened to minimize their area as seen by the electron beam and thereby avoid the possibility of excessive deflector current; indeed, deflectors 26 and 27 may even be constructed as simple parallel rods or wires if desired. Moreover, either or both of the sheet-like electron beams may be split into two or more beams subjected to a common transverse deflection field without departing from the spirit of the invention.

The electrode system is mounted within a suitable envelope (not shown) which may then be evacuated, gettered and based in accordance with well known procedures in the art. The entire structure may conveniently be included in a miniature tube envelope, a number of the electrode connections being made internally of the envelope in a manner to be described hereinafter for the purpose of minimizing the number of required external circuit connections.

Figure 6:
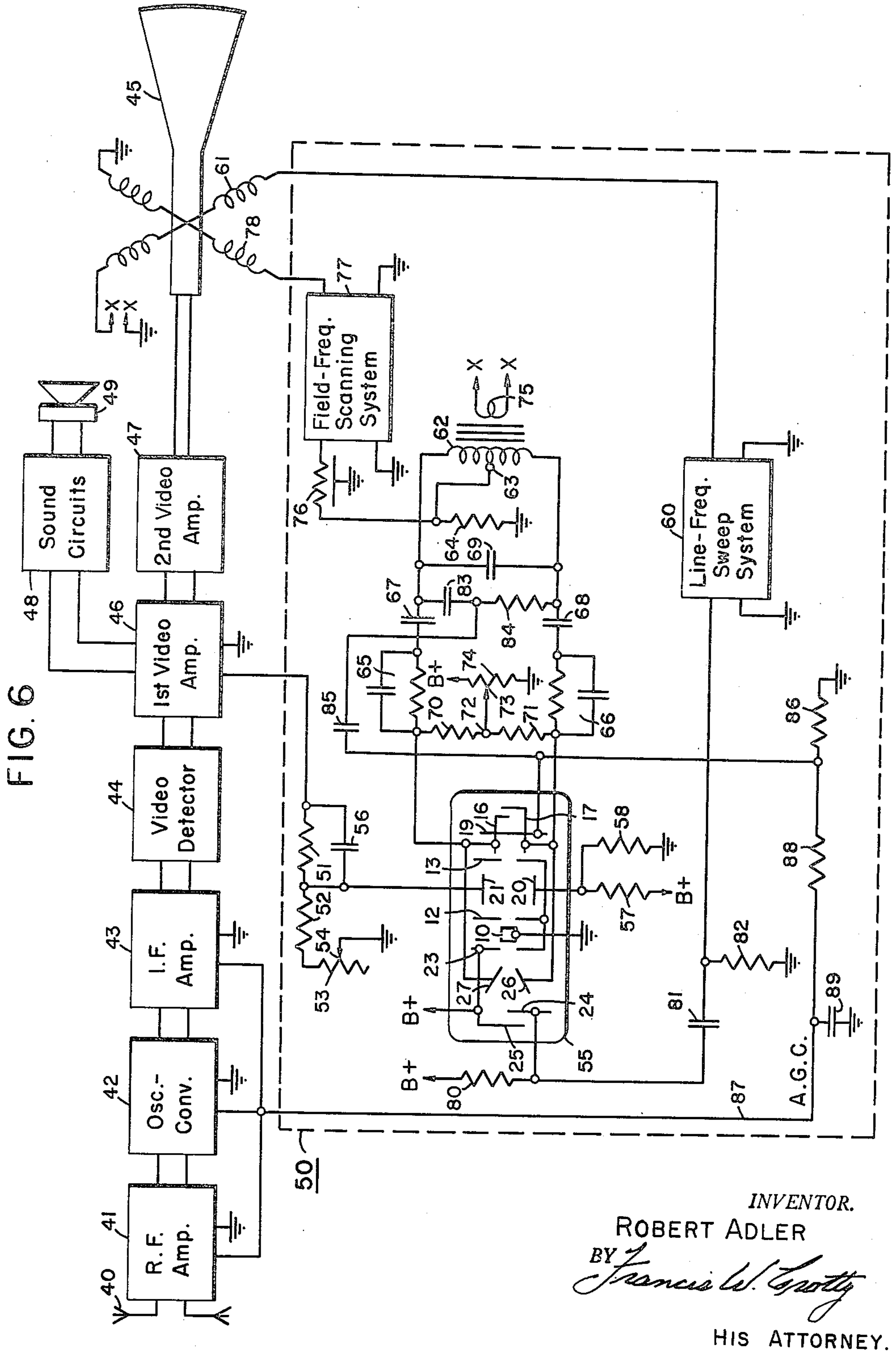
Figure 6 is a schematic diagram of a television receiver embodying an electron-discharge device constructed in accordance with the invention.

A beam deflection tube of the type shown and described in connection with Figures 1–5 may be employed in a television receiver in the manner schematically illustrated in Figure 6. Incoming composite television signals are intercepted by an antenna 40 and translated by receiving circuits, including a radio-frequency amplifier 41, an oscillator-converter 42 and an intermediate-frequency amplifier 43, to a video detector 44. Detected composite video signals from detector 44 are impressed on the input circuit of a cathode-ray tube 45 or other suitable image-reproducing device through first and second video amplifiers 46 and 47. Intercarrier sound signals from first video amplifier 46 are detected and amplified by conventional sound circuits 48 and impressed on a loudspeaker 49 or other suitable sound-reproducing device.

Composite video signals from first video amplifier 46 are also supplied to a synchronizing system and automatic gain control generator, generally designated by the reference numeral 50, by means of a voltage-divider network comprising resistors 51 and 52 connected in series with a potentiometer 53 having a grounded movable tap 54, the junction between resistors 51 and 52 being connected to one deflection plate 21, hereinafter termed the active deflector, in the right-hand section of a beam deflection tube 55 of the type shown and described in connection with Figures 1–5. A condenser 56 is connected in parallel with resistor 51. Cathode 10 of device 55 is connected to ground. Accelerating electrodes 12 and 23, target electrode 13, and second anode 25 of the left-hand section of device 55 are connected together (preferably internally of the envelope) and to a suitable source of unidirectional operating potential conventionally designated B+. Deflection plate 20 is connected to a tap on a voltage divider comprising resistors 57 and 58 connected between B+ and ground.

The synchronizing system also comprises a line-frequency sweep system 60, which may include a discharge tube and a power output stage, for impressing suitable deflection currents on the line-frequency deflection coil 61 associated with image-reproducing device 45. Controllector electrodes 16 and 17 of device 55 are coupled to opposite terminals of a coil 62, having a center tap 63 which is returned to ground through a resistor 64, by means of respective anti-hunt networks comprising shunt-connected resistor-condenser combinations 65 and 66, and condensers 67 and 68. A tuning condenser 69 is connected in parallel with coil 62, and a conductive load impedance, such as a pair of resistors 70 and 71, is connected between electrodes 16 and 17, the junction 72 between resistors 70 and 71 preferably being connected to the variable tap 73 of a potentiometer resistor 74 which is in turn connected between the positive terminal of a suitable source of unidirectional operating potential, such as B+, and ground. Coil 62 is inductively coupled to a coil 75 which is preferably connected in series between line-frequency deflection coil 61 and ground, as indicated by the terminal designations X—X. Center tap 63 of coil 62 is also coupled through an integrator 76 to a field-frequency scanning system 77 which provides suitable deflection currents to a field-frequency deflection coil 78 associated with image-reproducing device 45.

Controllector electrodes 16 and 17 are directly connected to electrostatic-deflection plates 27 and 26 respectively in the left-hand section of device 55, and anode 24 is connected to B+ through a load resistor 80 and to line-frequency sweep system 60 through a differentiating network comprising a series condenser 81 and a shunt resistor 82.

A keying signal is supplied to plate electrode 19 from the junction between a condenser 83 and a resistor 84 connected in series across the terminals of coil 62 by means of a coupling condenser 85, and a resistor 86 is connected between plate electrode 19 and ground. Plate electrode 19 is coupled to the automatic gain control (AGC) lead 87 by an integrating network comprising a series resistor 88 and a shunt condenser 89, and AGC lead 87 is connected to one or more of the receiving circuits comprising radio-frequency amplifier 41, oscillator-converter 42 and intermediate-frequency amplifier 43.

In normal operation, positive-polarity composite video signals, including the direct-voltage components, from the output circuit of first video amplifier 46 are applied to active deflection plate 21 by means of the voltage-divider network comprising resistors 51, 52 and 53 and condenser 56. Deflection plates 20 and 21 are so biased that the beam projected through aperture 11 of accelerating electrode 12 is normally directed to an electron-impervious portion of intercepting anode 13, as for instance, to a solid portion of anode 13 on the side of apertures 14 and 15 nearer deflection plate 20. Application of the positive-polarity composite video signals to deflection plate 21 causes a transverse deflection of the beam in accordance with the instantaneous signal amplitude. The operating potentials for the various electrodes are so adjusted that different longitudinal portions of the beam are respectively deflected entirely into aperture 14 and partially into aperture 15 of intercepting anode 13 in response to the synchronizing-signal components of the applied composite video signal; the beam is entirely intercepted by anode 13 and/or deflection plate 20 during video-signal intervals. As a consequence, plate current is only permitted to flow to electrodes 16, 17 and 19 during synchronizing-pulse intervals.

The left-hand section of device 55 serves as a line-frequency oscillator in the line-frequency scanning system. Oppositely phased sinusoidal signals are applied to deflection plates 26 and 27 by means of coil 62 and condenser 69 which are tuned to the line-scanning frequency and which are excited by means of coil 75 inserted in series with the line-frequency deflection coil 61. Consequently, the beam in the left-hand section of device 55 is caused to sweep back and forth between anodes 24 and 25, so that a square-wave output voltage is developed across resistor 80. This square-wave output voltage is differentiated by means of condenser 81 and resistor 82, and the resulting positive-polarity or negative-polarity pulses are employed to trigger line-frequency sweep system 60, depending on the construction of that sweep system.

At the same time, the same oppositely phased sinusoidal voltage waves applied to deflection plates 27 and 26 are impressed on controllector electrodes 16 and 17, respectively, in the right-hand section of device 55. As previously explained, current flow to controllector electrodes 16 and 17 is restricted to synchronizing-pulse intervals by virtue of the geometry of target electrode 13. The current distribution between electrodes 16 and 17 is dependent upon the instantaneous potential difference between these electrodes during the synchronizing-pulse intervals.

The oppositely phased sinusoidal signals developed across coil 62 and condenser 69 serve as comparison signals in a balanced automatic-frequency-control phase-detector. If the comparison signals are properly phased with respect to the incoming line-frequency synchronizing-signal pulses, the instantaneous potentials of controllector electrodes 16 and 17 are equal at the time of the arrival of each synchronizing pulse, and the space current passing through aperture 14 is equally divided between electrodes 16 and 17, with the result that no unidirectional control potential difference is developed between the controllector electrodes. On the other hand, if the comparison signals and the incoming line-frequency synchronizing-signal pulses are not in phase synchronism, the instantaneous potentials of the two controllector electrodes 16 and 17 at the time of arrival of each line-frequency synchronizing-signal pulse are different, so that the beam currents collected by electrodes 16 and 17 are unequal and a unidirectional control signal is developed between controllector electrodes 16 and 17. Since controllector electrodes 16 and 17 are directly connected to deflection plates 27 and 26 respectively in the left-hand section of device 55, the beam in the left-hand section is accelerated or retarded in its progress from anode 24 to anode 25 and back. As a result, the positive and negative half-cycles of the output voltage wave developed across resistor 80 are altered in time duration in accordance with the unidirectional control potential difference between electrodes 16 and 17. The quasi-square wave thus developed is differentiated to provide triggering pulses for line-frequency sweep system 60. Since the triggering pulses are derived by differentiating the leading edges of the output quasi-square wave, and since the timing of these leading edges is varied in accordance with the developed AFC potential, phase synchronism of the line-frequency sweep system with the incoming line-synchronizing pulses is assured.

As explained in connection with Figures 4A, 4B, and 4C, the operating voltage for the target electrode 13 and the controllector electrodes 16 and 17 may be so chosen that the control characteristics of electrodes 16 and 17 are substantially independent of the point of entry of the electron beam into the sync clipping slot 14. Consequently, such variations in the position of the beam during synchronizing-pulse intervals as may result from changes in the level of the composite video signal applied to active deflector 21 have no substantial effect on the AFC action. Moreover, the entire space current passing through slot 14 contributes to the AFC potential applied between electrostatic-deflection electrodes 26 and 27.

In order to obtain the desired automatic-frequency-control (AFC) action, it is essential that a condition in which the comparison signals lag the incoming synchronizing-signal pulses result in an increase in the frequency of the local oscillator comprising the left-hand section of device 55, line-frequency sweep system 60, and feedback circuit 75, 62. This operation is insured by the common direct connections for both the sinusoidal comparison signals and the unidirectional AFC potential from controllector electrodes 16 and 17 to deflection plates 27 and 26 respectively. It is possible, for a given construction of sweep system 60, that the system may fail to oscillate altogether due to incorrect phasing of the comparison signals and the triggering pulses for the line-frequency sweep system; this condition may be corrected by merely reversing the terminal connections of feedback coil 75 or of coil 62, or, if separate leads are provided for anodes 24 and 25, by reversing the circuit connections of these two anodes. Proper pull-in action is automatically insured for any condition for which oscillation is obtained.

To obtain field-frequency synchroniaztion, the output currents to controllector electrodes 16 and 17 are effectively combined by means of a resistor 64 connected in the common ground return for controllector electrodes 16 and 17. The combined output appearing across resistor 64 is integrated by means of integrator 76 to provide a control signal for field-frequency scanning system 77. In this connection, the improved tube of the present invention provides a further advantage over a tube employing phase-detector electrodes constructed as simple plates behind the sync clipping slot. Since the entire space current passing through slot 14 is collected by the two controllector electrodes 16 and 17, any disrupting effect of the line-frequency AFC system on the field-frequency scansion is avoided by deriving the field-frequency drive pulses from an output load impedance connected in a common return circuit for controllector electrodes 16 and 17. The beam current through aperture 14, representing the clipped sync pulses, is first used in its entirety to provide a balanced line-frequency control potential, and then again in its entiretly to synchronize the field scansion. The use of an output load impedance connected in a common return circuit for the phase-detector electrodes for deriving field-frequency driving pulses is specifically described and claimed in the copending application of Robert Adler, Serial No. 260,221, filed December 6, 1951, for "Synchronizing Control Apparatus," and assigned to the present assignee. It is of course also possible to employ a separate plate electrode for the sole purpose of developing field-frequency synchronizing-signal pulses for application to the field-frequency scanning system, as described in the above-identified copending Spracklen application.

Plate electrode 19 develops a unidriectional control potential indicative of the amplitude of the composite video signals for application to the receiving circuits preceding the video detector to effect automatic gain ontrol of the receiver. The sinusoidal line-frequency oltage developed across coil 62 and condenser 69 is npressed across the series combination of condenser 3 and resistor 84, and the phase-shifted sinusoidal voltage vave appearing at the junction of resistor 84 and conlenser 83 is applied to plate electrode 19 as a keying r energizing signal. Condenser 83 and resistor 84 are roportioned to provide a phase shift of the keying signal vith respect to the voltage across coil 62 which is suitble to insure peak energization of plate electrode 19 luring the line-synchronizing pulse intervals. This keyng signal performs a gating function, permitting plate electrode 19 to accept space electrons passing through perture 15 of intercepting anode 13 only during those ntervals when plate electrode 19 is instantaneously positive. Consequently, a control potential is developed across resistor 86 in response to time coincidence of the synchronizing-signal components of the composite video signals and the positive-polarity keying signal applied to plate electrode 19. This control potential is integrated by resistor 88 and condenser 89 to provide a negative-polarity unidirectional control potential for application to the AGC lead 87.

Certain important advantages of the system described in connection with Figure 6 may best be understood by consideration of that figure in connection with Figures 1 and 2. Since aperture 14 in intercepting anode 13 has definite fixed boundaries, it is apparent that deflection of the beam beyond aperture 14 results in interception thereof by anode 13. Consequently, extraneous noise pulses, which are generally of much larger amplitude than any desired component of the composite video signals, are not translated to controllector electrodes 16 and 17, and loss of synchronization due to extraneous impulse noise is substantially precluded. This operation is apparent from the operating characteristic 31 of Figure 2. When composite video signals comprising synchronizing-pulse components 33 and video-signal components 34 are impressed on active deflection plate 21, extraneous noise pulses 35, which are of greater amplitude than the synchronizing-pulse components by an amount exceeding the voltage represented by the spacing between vertical lines 36 and 37, result in deflection of the beam beyond aperture 14; consequently, these noise pulses are not translated to the output circuits associated with controllector electrodes 16 and 17, and substantial noise immunity is achieved. Aperture 14 is preferably of constant length in a direction parallel to cathode 10, in order to provide output current pulses of constant amplitude for application to scanning system 77 and to insure proper AFC action in spite of such rapid fluctuations in the amplitude of the synchronizing pulses as are occasionally encountered.

The operation of the gated automatic gain control system may perhaps best be understood by a consideration of operating characteristic 32 of Figure 2. Space electrons are permitted to pass to plate electrode 19 only when the electron beam is laterally deflected at least partially into aperture 15, and then only if plate electrode 19 is instantaneously maintained at a positive potential by the keying signal applied to that electrode. In an equilibrium condition, the deflection-control system is so biased that the peaks of the synchronizing-signal pulses are impressed on the rising portion of characteristic 32, as indicated by vertical line 36. When the signal amplitude increases, the peaks of the synchronizing pulses 33 instantaneously extend farther to the right, and the space current to plate electrode 19 is increased. This results in an increase in the negative unidirectional control potential applied to the receiving circuits 41, 42 and 43, thus reducing the gain of these circuits and thereby restoring the amplitude of the input signal applied to active deflection plate 21 to the equilibrium value indicated in the drawing. On the other hand, if the signal amplitude instantaneously decreases, the negative gain-control potential decreases and the gain of the receiving circuits is increased to restore equilibrium. Noise pulses 35 occurring during the middle part of any video-signal interval have substantially no effect on the automatic gain control potential since plate electrode 19 is maintained at or below cathode potential during approximately that half of each line-frequency operating cycle by the keying signal applied from sweep system 60. Moreover, even such noise pulses as may occur during synchronizing-pulse intervals or at other times when plate electrode 19 is positive relative to cathode 10, if of sufficiently great amplitude, are prevented from contributing to the automatic gain control potential by virtue of the finite boundaries of aperture 15. Consequently, even greater noise immunity is obtained with the present automatic gain control system than with conventional gated automatic gain control arrangements employing grid-controlled tubes for AGC generation.

Since it is desirable for the synchronizing current pulses developed at controllector electrodes 16 and 17 to be of constant amplitude, it is preferred that the peaks of the synchronizing-pulse components 33 be impressed on characteristic 31 at a constant-current region of that characteristic; in other words, the synchronizing-pulse components of the applied composite video signals should cause deflection of the upper portion of the beam entirely into aperture 14. At the same time, because of the automatic gain control action, the peaks of the synchronizing-pulse components 33 are normally superimposed on a sloping portion of characteristic 32; in other words, the synchronizing-pulse components of the applied composite video signals cause deflection of the lower portion of the beam only partially into aperture 15. By disposing apertures 14 and 15 in overlapping or staggered alignment in a direction parallel to cathode 10, as illustrated in Figure 1, it is insured that whenever the automatic gain control action establishes the equilibrium condition illustrated by the graphical representation of Figure 2, synchronizing pulses of constant amplitude are developed at controllector electrodes 16 and 17; in other words, the clipping level of the synchronizing-signal separator is automatically adjusted to accommodate varying signal strengths at the receiver input. The direct voltage-to-alternating voltage transmission ratio of the voltage-divider network comprising resistors 51, 52 and 53 and condenser 56 may be adjusted by means of variable tap 54 to a value of the order of one-half to preclude receiver paralysis under abnormal operating conditions, in the manner described and claimed in the copending application of John G. Spracklen, Serial No. 259,063, filed November 30, 1951, now U. S. Patent No. 2,684,403, issued July 20, 1954 for "Television Receiver" and assigned to the present assignee.

Figure 7:
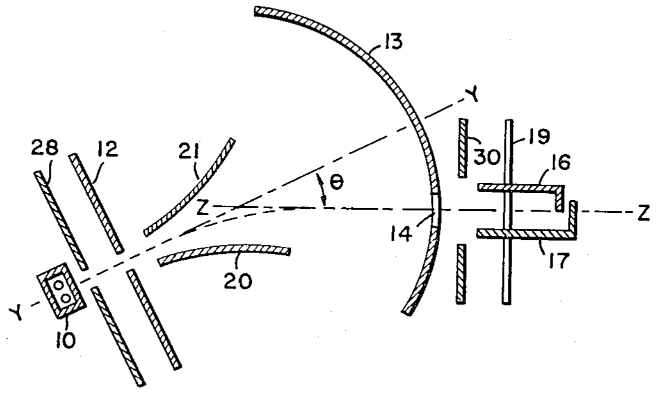
Figure 7 is a cross-sectional view of another embodiment of the invention.

In the construction of Figures 1 and 5, deflection-control electrodes 20 and 21 and controllector electrodes 16 and 17 are effectively symmetrically arranged with respect to a common linear axis. It has been found that, while such a construction affords numerous advantages over the construction disclosed in the first-mentioned Spracklen application, such a coaxial arrangement may result under certain operating conditions in excessive current flow to the active or input deflector 21. Such current flow to active deflector 21 results in the build-up of a charge in condenser 56 and a corresponding undesirable reduction in the average positive operating potential of deflector 21. In the embodiment of Figure 7, this difficulty is avoided by arranging the controllector electrodes 16 and 17 on an axis Z—Z which intersects the axis Y—Y of the electron gun and the input deflection-control system at an acute angle $\theta$, which may be of the order of 20°. The input deflection-control system, comprising deflection-control electrodes 20 and 21, is arranged with its center of deflection substantially coinciding with the intersection of the two axes Z—Z and Y—Y, and the target electrode is formed as a cylindrical segment with a center of curvature at substantially the same point of intersection. Slot 14 is centered with respect to the axis Z—Z of the controllector system. In other respects, the construction of Figure 7 is substantially identical with that of the right-hand portion of Figure 5.

With the arrangement of Figure 7, electrons originating at cathode 10 are first projected along axis Y—Y which points toward the center of cylindrical target electrode 13. The passive or companion deflector 20 is so biased that, in the absence of an input signal applied to active deflector 21, substantially the entire beam is collected by companion deflector 20. When a normal composite video signal is applied to active deflector 21, the beam is deflected upwardly into aperture 14 along the axis Z—Z of the controllector system during synchronizing-pulse intervals, and the operation of the tube is substantially identical with that set forth in the previous discussion. Noise pulses of large amplitude may result in upward deflection of the beam beyond slot 14, but even during such noise pulse intervals the deflection is not great enough to cause any substantial portion of the beam to strike active deflector 21. Consequently, by virtue of the angular relationship between the axes of the input deflection system and the controllector system, it is insured that substantially no space current is drawn by active deflector 21, and undesirable reduction of the positive operating potential of the active deflector is substantially avoided. Thus it is apparent that, to obtain the advantages of the present invention, all that is necessary is that the controllector system be substantially centered on an axis registering with the center of the sync clipping aperture; the initial direction in which the beam is projected may coincide with this axis, or the beam may initially be projected in a direction at an angle to the axis of the controllector system, as dictated by other considerations of a practical nature.

Figure 8:
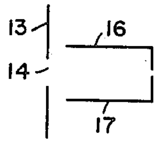
Figures 8, 9 and 10 are schematic representations of alternative constructions in accordance with the invention.
Figure 9:
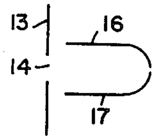
Figure 10:
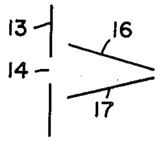

In all of the embodiments thus far described, controllector electrodes 16 and 17 are formed as a pair of generally L-shaped solid plates having longitudinally extending deflection-control portions disposed in substantially parallel planes and having electron-impervious collector portions extending toward each other in spaced parallel planes normal to the planes of the control portions. This construction is preferred for the reason that all electrons passing through slot 14 are effectively trapped between the controllector electrodes. However, other constructions, in which substantially all electrons entering the controllector system are collected thereby, may be employed. For example, in Figure 8, the collector portions of controllector electrodes 16 and 17 are coplanar, each extending inwardly toward and terminating just short of the axis of the controllector system. In the arrangement of Figure 9, the collector portions are curved inwardly toward the axis, while in the construction of Figure 10, controllector electrodes 16 and 17 constitute flat plates disposed in intersecting planes, the spacing between the plates decreasing to a minimal value at the ends thereof most remote from slot 14. It may be said of all of these constructions that each of the controllector electrodes comprises a control portion and a collector portion, for the reason that each exerts a controlling influence as well as collecting space electrons; although it may be difficult to assign a boundary between the control portion and the collector portion, it is nonetheless true that each of the electrodes performs both functions. With each of these arrangements, substantially the entire space current projected through the sync clipping slot is utilized in producing an AFC potential for the line-frequency scanning system and, optionally, drive pulses for the field-frequency scanning system.

Thus the present invention provides a new and improved electron-discharge device particularly well adapted to use in synchronizing and automatic gain control systems of television receivers and the like. The tube construction is simple and lends itself readily to mass production manufacturing techniques, and the system is capable of performance superior to that obtained in conventional television receivers employing three or more separate electron-discharge devices to perform the corresponding functions.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. An electron-discharge device comprising: means including an electron-emissive cathode for projecting an electron stream generally along a predetermined axis; a pair of controllector electrodes having control portion disposed on opposite sides of said axis and terminating in respective electron-impervious collector portions on corresponding opposite sides of said axis and electrically connected to said control portions, said collector portions conjointly defining a collector system which effectively intercepts said axis at a location more remote from said cathode than said control portions; and an additional electrode disposed intermediate said cathode and said controllector electrodes and provided with an aperture intersecting said axis; said additional electrode and said controllector electrodes constituting elements of an electrostatic lens for focusing said electron stream substantially at said location.

2. An electron-discharge device comprising: means including an electron gun for projecting an electron beam generally along a predetermined axis; a pair of controllector electrodes having deflection-control portions disposed on opposite sides of said axis and terminating in respective electron-impervious collector portions on corresponding opposite sides of said axis and electrically connected to said control portions, said collector portions conjointly defining a collector system which effectively intercepts said axis at a location more remote from said electron than said deflection-control portions; and an additional electrode disposed intermediate said electron gun and said controllector electrodes and provided with an aperture symmetrically intersecting said axis; said additional electrode and said controllector electrodes constituting elements of an electrostatic lens for focusing said electron beam substantially at said location.

3. An electron-discharge device comprising: means including an electron-emissive cathode for projecting an electron stream generally along a predetermined axis; a pair of controllector electrodes having control portions disposed on opposite sides of said axis and terminating in respective electron-impervious collector portions on corresponding opposite sides of said axis and integral with said control portions, said collector portions conjointly defining a collector system which effectively intercepts said axis at a location more remote from said cathode than said control portions; an additional electrode disposed intermediate said cathode and said controllector electrodes and provided with an aperture intersecting said axis; said additional electrode and said controllector electrodes constituting elements of an electrostatic lens for focusing said electron stream substantially at said location; and means including a further electrode intermediate said cathode and said electrostatic lens for effectively controlling the intensity of said electron stream.

4. An electron-discharge device comprising: means including an electron-emissive cathode for projecting an electron stream generally along a predetermined axis; a pair of controllector electrodes having longitudinally extending control portions disposed in planes generally parallel to and on opposite sides of said axis and terminating in respective electron-impervious collector portions on corresponding opposite sides of said axis and integral with said control portions, said collector portions being directed inwardly toward said axis to define a collector system which effectively intercepts said axis at a location more remote from said cathode than said control portions; and an additional electrode disposed intermediate said cathode and said controllector electrodes and provided with an aperture intersecting said axis; said additional electrode and said controllector electrodes constituting elements of an electrostatic lens for focusing said electron stream substantially at said location.

5. An electron-discharge device comprising: means including an electron-emissive cathode for projecting an electron stream generally along a predetermined axis; a pair of controllector electrodes having longitudinally extending control portions disposed in planes generally parallel to and on opposite sides of said axis and terminating in respective electron-impervious collector portions on corresponding opposite sides of said axis and integral with said control portions, said collector portions extending inwardly toward said axis in overlapping spaced relation to define a collector system which effectively intercepts said axis at a location more remote from said cathode than said control portions; an additional electrode disposed intermediate said cathode and said controllector electrodes and provided with an aperture intersecting said axis; said additional electrode and said controllector electrodes constituting elements of an electrostatic lens for focusing said electron stream substantially at said location; and means including a further electrode intermediate said cathode and said electrostatic lens for effectively controlling the intensity of said electron stream.

6. An electron-discharge device comprising: means including an electron-emissive cathode for projecting an electron stream generally along a predetermined axis; a pair of controllector electrodes having control portions disposed on opposite sides of said axis and terminating in respective electron-impervious collector portions on corresponding opposite sides of said axis and electrically connected to said control portions, said collector portions conjointly defining a collector system which effectively intercepts said axis at a location more remote from said cathode than said control portions; an electron lens comprising said controllector electrodes and an additional apertured electrode intermediate said cathode and said controllector electrodes for focusing said electron stream substantially at said location; and means including a further electrode intermediate said cathode and said additional electrode for effectively controlling the intensity of said electron stream.

7. An electron-discharge device comprising: means including an electron-emissive cathode for projecting an electron stream generally along a predetermined axis; a pair of controllector electrodes having control portions disposed on opposite sides of said axis and further having respective electron-impervious collector portions on corresponding opposite sides of said axis and electrically connected to said control portions, said collector portions conjointly defining a collector system which effectively intercepts said axis at a location more remote from said cathode than said control portions; and means including a target electrode having an aperture centered on said axis and disposed between said cathode and said controllector electrodes for effectively controlling the intensity of said electron stream.

8. An electron-discharge device comprising: means including an electron gun for projecting an electron beam generally along a predetermined axis; a pair of controllector electrodes having deflection-control portions disposed on opposite sides of said axis and further having respective electron-impervious collector portions on corresponding opposite sides of said axis and electrically connected to said deflection-control portions, said collector portions conjointly defining a collector system which effectively intercepts said axis at a location more remote from said electron gun than said deflection-control portions; a target electrode having an aperture centered on said axis and disposed between said electron gun and said controllector electrodes; and a deflection-control system disposed between said electron gun and said target electrode for subjecting said beam to a transverse deflection field.

9. An electron-discharge device comprising: means including an electron gun for projecting an electron beam generally along a predetermined axis; a pair of controllector electrodes having deflection-control portions disposed on opposite sides of said axis and further having respective electron-impervious collector portions on corresponding opposite sides of said axis and electrically connected to said deflection-control portions, said collector portions conjointly defining a collector system which effectively intercepts said axis at a location more remote from said electron gun than said deflection-control portions; a target electrode having an aperture centered on said axis and disposed between said electron gun and said controllector electrodes; and a pair of electrostatic-deflection electrodes disposed on opposite sides of said axis between said electron gun and said target electrode for subjecting said beam to a transverse deflection field.

10. In combination: means including an electron gun for projecting an electron beam generally along a predetermined axis; a pair of controllector electrodes having deflection-control portions disposed on opposite sides of said axis and further having respective electron-impervious collector portions on corresponding opposite sides of said axis and electrically connected to said deflection-control portions, said collector portions conjointly defining a collector system which effectively intercepts said axis at a location more remote from said electron gun than said deflection-control portions; a beam deflection system including a pair of electrostatic-deflection electrodes; and means electrically connecting said controllector electrodes to said electrostatic-deflection electrodes.

11. In combination: an electron-discharge device comprising in the order named an electron gun for projecting an electron beam, a deflection-control system responsive to an applied input signal for subjecting said beam to a transverse deflection field, a target electrode having an aperture which is narrow with respect to the full deflection range of said deflection-control system and which is centered on a predetermined axis, a pair of deflection-control electrodes disposed on opposite sides of said axis, and a collector system; and means including said target electrode and said deflection-control electrodes for focusing said beam to converge on said collector system at a location substantially independent of said applied input signal.

12. In combination: an electron-discharge device comprising in the order named an electron gun including an elongated cathode for projecting a sheet-like electron beam of substantially rectangular cross-section, a deflection-control system responsive to an applied input signal for subjecting said beam to a transverse deflection field, a target electrode having a slot which is narrow with respect to the full deflection range of said deflection-control system and which is centered on a predetermined axis, a pair of deflection-control electrodes disposed on opposite sides of said axis, and a collector system; and means including said target electrode and said deflection-control electrodes for focusing said beam to converge on said collector system at a location substantially independent of said applied input signal.

13. In combination: an electron-discharge device comprising in the order named an electron gun for projecting an electron beam, a deflection-control system responsive to an applied input signal for subjecting said beam to a transverse deflection field, a target electrode having an aperture which is narrow with respect to the full deflection range of said deflection-control system and which is centered on a predetermined axis, a pair of deflection-control electrodes disposed on opposite sides of said axis, and a pair of collector electrodes conjointly defining a collector system which effectively intercepts said axis; and means including said target electrode and said deflection-control electrodes for focusing said beam to converge on said collector system at a location substantially independent of said applied input signal.

14. In combination: an electron-discharge device comprising in the order named an electron gun for projecting an electron beam, a deflection-control system responsive to an applied input signal for subjecting said beam to a transverse deflection field, a target electrode having an aperture which is narrow with respect to the full deflection range of said deflection-control system and which is centered on a predetermined axis, a pair of deflection-control electrodes disposed on opposite sides of said axis, and a pair of collector electrodes electrically connected to said deflection-control electrodes and conjointly defining a collector system which effectively intercepts said axis; and means including said target electrode and said deflection-control electrodes for focusing said beam to converge on said collector system at a location substantially independent of said applied input signal.

15. In combination: an electron-discharge device comprising in the order named an electron gun for projecting an electron beam, a deflection-control system responsive to an applied input signal for subjecting said beam to a transverse deflection field, a target electrode having an aperture which is narrow with respect to the full deflection range of said deflection-control system and which is centered on a predetermined axis, a pair of deflection-control electrodes disposed on opposite sides of said axis, and a pair of collector electrodes integral with said deflection-control electrodes and conjointly defining a collector system which effectively intercepts said axis; and an electrostatic lens system including said target electrode and said deflection-control electrodes for focusing said beam to converge on said collector system at a location substantially independent of said applied input signal.

16. In combination: an electron-discharge device comprising in the order named an electron gun for projecting an electron beam, a deflection-control system responsive to an applied input signal for subjecting said beam to a transverse deflection field, a target electrode having an aperture which is narrow with respect to the full deflection range of said deflection-control system and which is centered on a predetermined axis, and a pair of controllector electrodes having longitudinally extending control portions disposed in planes generally parallel to and on opposite sides of said axis and further having collector portions extending toward said axis and conjointly defining a collector system which effectively intercepts said axis at a location more remote from said electron gun than said control portions; and means including said target electrode and said controllector electrodes for focusing said beam to converge on said collector system at a location substantially independent of said applied input signal.

17. In combination: an electron-discharge device comprising in the order named an electron gun for projecting an electron beam, a deflection-control system responsive to an applied input signal for subjecting said beam to a transverse deflection field, a target electrode having an aperture which is narrow with respect to the full deflection range of said deflection-control system and which is centered on a predetermined axis, a pair of deflection-control electrodes disposed on opposite sides of said axis, and a collector system; and an electrostatic lens system including said target electrode, said deflection-control electrodes, and an additional focusing electrode for focusing said beam to converge on said collector system at a location substantially independent of said applied input signal.

18. In combination: an electron-discharge device comprising means including an electron gun for projecting an electron beam, and a pair of controllector electrodes comprising spaced respective control portions for subjecting said beam to a transverse deflection field and collector portions electrically connected to said control portions for collectively receiving substantially all electrons projected between said control portions; means for applying an input signal between said controllector electrodes; and an output system connected to said controllector electrodes for utilizing an output signal derived therefrom.

19. In combination: an electron-discharge device comprising means including an electron gun for projecting an electron beam, and a pair of controllector electrodes comprising spaced respective control portions for subjecting said beam to a transverse deflection field and collector portions electrically connected to said control portions for collectively receiving substantially all electrons projected between said control portions; a push-pull input circuit for applying a balanced input signal between said controllector electrodes; and a load impedance connected between said controllector electrodes for deriving an output signal.

20. In combination: an electron-discharge device comprising means including an electron gun for projecting an electron beam, and a pair of controllector electrodes comprising spaced respective control portions for subjecting said beam to a transverse deflection field and collector portions electrically connected to said control portions for collectively receiving substantially all electrons projected between said control portions, and means intermediate said electron gun and said controllector electrodes for effectively controlling the intensity of said electron beam; means for applying an input signal between said controllector electrodes; and an output system connected to said controllector electrodes for utilizing an output signal derived therefrom.

21. In combination: an electron-discharge device comprising means including an electron gun for projecting an electron beam, and a pair of controllector electrodes comprising spaced respective control portions for subjecting said beam to a transverse deflection field and collector portions electrically connected to said control portions for collectively receiving substantially all electrons projected between said control portions, and means including a target electrode having an aperture centered on said axis and disposed between said electron gun and said controllector electrodes for effectively controlling the intensity of said electron beam; means for applying an input signal between said controllector electrodes; and an output system connected to said controllector electrodes for utilizing an output signal derived therefrom.

22. In combination: an electron-discharge device comprising means including an electron gun for projecting an electron beam, and a pair of controllector electrodes comprising spaced respective control portions for subjecting said beam to a transverse deflection field and collector portions electrically connected to said control portions for collectively receiving substantially all electrons projected between said control portions, a target electrode interposed between said electron gun and said controllector electrodes and provided with an aperture centered on said axis, and a pair of electrostatic-deflection electrodes disposed between said electron gun and said target electrode for effectively controlling the intensity of said electron beam as projected between said control portions; means for applying an input signal between said controllector electrodes; and an output system connected to said controllector electrodes for utilizing an output signal derived therefrom.

23. In combination: an electron-discharge device comprising means including an electron gun for projecting an electron beam, and a pair of controllector electrodes comprising spaced respective control portions for subjecting said beam to a transverse deflection field and collector portions electrically connected to said control portions for collectively receiving substantially all electrons projected between said control portions; means for applying an input signal between said controllector electrodes; a deflection-control system including a pair of electrostatic-deflection electrodes; and means electrically connecting said controllector electrodes to said electrostatic-deflection electrodes.

24. An electron-discharge device comprising: an electron gun for projecting an electron beam; a target electrode disposed in a plane intercepting the undeflected path of said beam and provided with an aperture which has a predetermined width in a direction generally transverse to said path and which is centered on a predetermined axis; a deflection-control system responsive to an input signal for transversely deflecting said beam across said target electrode and, under predetermined operating conditions, through said aperture; and a pair of controllector electrodes following said aperture and having control portions disposed on opposite sides of said axis, and further having collector portions electrically connected to said control portions and conjointly defining a collector system which effectively intercepts said axis at a location more remote from said target electrode than said control portions for collectively receiving substantially all electrons projected through said aperture.

25. An electron-discharge device comprising: an electron gun including an elongated cathode for projecting a sheet-like electron beam of substantially rectangular cross-section; a target electrode disposed in a plane intercepting the undeflected path of said beam and provided with a slot which has a predetermined width in a direction generally transverse to said path and which is centered on a predetermined axis; a deflection-control system responsive to an input signal for transversely deflecting said beam across said target electrode and, under predetermined operating conditions, through said slot; and a pair of controllector electrodes following said slot and having control portions disposed on opposite sides of said axis, and further having collector portions electrically connected to said control portions and conjointly defining a collector system which effectively intercepts said axis at a location more remote from said target electrode than said control portions for collectively receiving substantially all electrons projected through said slot.

26. An electron-discharge device comprising: an electron gun for projecting an electron beam; a target electrode disposed in a plane intercepting the undeflected path of said beam and provided with an aperture which has a predetermined width in a direction generally transverse to said path and which is centered on a predetermined axis; a deflection-control system comprising a pair of electrostatic-deflection electrodes and responsive to an input signal for transversely deflecting said beam across said target electrode and, under predetermined operating conditions, through said aperture; a pair of controllector electrodes following said aperture and having control portions disposed on opposite sides of said axis, and further having collector portions electrically connected to said control portions and conjointly defining a collector system which effectively intercepts said axis at a location more remote from said target electrode than said control portions for collectively receiving substantially all electrons projected through said aperture, the distribution of said electrons between said controllector electrodes being determined substantially entirely by the potential difference therebetween.

27. An electron-discharge device comprising: an electron gun for projecting an electron beam; a target electrode disposed in a plane intercepting the undeflected path of said beam and provided with an aperture which has a predetermined width in a direction generally transverse to said path and which is centered on a predetermined axis; a deflection-control system responsive to an input signal for transversely deflecting said beam across said target electrode and, under predetermined operating conditions, through said aperture; and a pair of controllector electrodes following said aperture and having longitudinally extending deflection-control portions disposed in planes substantially parallel to and on opposite sides of said axis. and further having collector portions integral with said deflection-control portions and each extending toward said axis in a plane substantially normal thereto, said collector portions conjointly defining a collector system which effectively intercepts said axis at a location more remote from said target electrode than said deflection-control portions for collectively receiving substantially all electrons projected through said aperture.

28. An electron-discharge device comprising: an electron gun for projecting an electron beam; a target electrode disposed in a plane intercepting the undeflected path of said beam and provided with an aperture which has a predetermined width in a direction generally transverse to said path and which is centered on a predetermined axis; a deflection-control system responsive to an input signal for transversely deflecting said beam across said target electrode and, under predetermined operating conditions, through said aperture; and a pair of controllector electrodes following said aperture and having longitudinally extending deflection-control portions disposed in planes substantially parallel to and on opposite sides of said axis, and further having collector portions integral with said deflection-control portions and extending toward said axis in spaced parallel planes substantially normal thereto, at least one of said collector portions intercepting said axis, said collector portions conjointly defining a collector system which effectively intercepts said axis at a location more remote from said target electrode than said deflection-control portions for collectively receiving substantially all electrons projected through said aperture.

29. An electron-discharge device comprising: an electron gun including an elongated cathode having a pair of oppositely disposed elongated emissive surfaces for projecting a pair of sheet-like electron beams each of substantially rectangular cross-section; a target electrode disposed in a plane intercepting the undeflected path of one of said beams and provided with an aperture which has a predetermined width in a direction generally transverse to said path and which is centered on a predetermined axis; a deflection-control system responsive to an input signal for transversely deflecting said one beam across said target electrode and, under predetermined operating conditions, through said aperture; a pair of controllector electrodes following said aperture and having control portions disposed on opposite sides of said axis, and further having collector portions electrically connected to said control portions and conjointly defining a collector system which effectively intercepts said axis at a location more remote from said target electrode than said control portions for collectively receiving substantially all electrons projected through said aperture; a pair of anodes having active portions on opposite sides of the undeflected path of the other of said beams; a pair of electrostatic-deflection electrodes intermediate said cathode and said anodes for controlling the distribution of said other beam between said anodes; and means electrically connecting said controllector electrodes to said electrostatic-deflection electrodes.

30. An electron-discharge device comprising: an electron gun for projecting an electron beam along a predetermined first axis; a pair of controllector electrodes having control portions disposed on opposite sides of a second axis intersecting said first axis, and further having collector portions electrically connected to said control portions and conjointly defining a collector system which effectively intercepts said second axis at a location more remote from said electron gun than said control portions; a target electrode intermediate said electron gun and said controllector electrodes and having an aperture centered on said second axis; and a pair of electrostatic-deflection electrodes having a center of deflection substantially coinciding with the intersection of said axes.

31. An electron-discharge device comprising: an electron gun for projecting an electron beam along a predetermined first axis; a pair of controllector electrodes having control portions disposed on opposite sides of a second axis intersecting said first axis, and further having collector portions electrically connected to said control portions and conjointly defining a collector system which effectively intercepts said second axis at a location more remote from said electron gun than said control portions;

a curved target electrode disposed between said electron gun and said controllector electrodes, having a center of curvature substantially coinciding with the intersection of said axes and having an aperture centered on said second axis; and a pair of electrostatic-deflection electrodes having a center of deflection substantially coinciding with said intersection.

32. An electron-discharge device comprising: an electron gun including an elongated cathode for projecting a sheet-like electron beam of substantially rectangular cross-section along a predetermined first axis; a pair of controllector electrodes having control portions disposed on opposite sides of a second axis intersecting said first axis, and further having collector portions integral with said control portions and conjointly defining a collector system which effectively intercepts said second axis at a location more remote from said electron gun than said control portions; a target electrode in the form of a cylindrical segment having a center of curvature substantially coinciding with the intersection of said axes and having an aperture centered on said second axis; and a pair of electrostatic-deflection electrodes having a center of deflection substantially coinciding with said intersection.

References Cited in the file of this patent

UNITED STATES PATENTS

| | | |
|---|---|---|
| 2,104,834 | Gardner | Jan. 11, 1938 |
| 2,256,301 | Wagner | Sept. 16, 1941 |
| 2,257,795 | Gray | Oct. 7, 1941 |
| 2,274,194 | Farnsworth | Feb. 24, 1942 |
| 2,322,556 | Ziebolz | June 22, 1943 |
| 2,369,750 | Nagy et al. | Feb. 20, 1945 |
| 2,390,250 | Hansell | Dec. 4, 1945 |
| 2,404,106 | Snyder | July 16, 1946 |
| 2,551,810 | Mueller | May 8, 1951 |
| 2,578,458 | Thompson | Dec. 11, 1951 |
| 2,581,612 | Thompson | Jan. 8, 1952 |
| 2,606,300 | Adler | Aug. 5, 1952 |
| 2,632,127 | Wagner | Mar. 17, 1953 |

FOREIGN PATENTS

| | | |
|---|---|---|
| 506,454 | Great Britain | May 30, 1939 |